(12) United States Patent
Flynn et al.

(10) Patent No.: US 8,407,307 B1
(45) Date of Patent: Mar. 26, 2013

(54) FLIGHT INFORMATION SENDING SYSTEM AND METHOD

(75) Inventors: Lorraine Flynn, Newton, MA (US); Mary Flynn, Newton, MA (US); James Steinberg, Melrose, MA (US)

(73) Assignee: Flightview, Inc., Newton, MA (US)

( * ) Notice: Subject to any disclaimer, the term of this patent is extended or adjusted under 35 U.S.C. 154(b) by 579 days.

(21) Appl. No.: 11/937,835

(22) Filed: Nov. 9, 2007

Related U.S. Application Data

(60) Provisional application No. 60/865,270, filed on Nov. 10, 2006.

(51) Int. Cl.
*G06F 15/16* (2006.01)
(52) U.S. Cl. ............. 709/207; 709/206; 705/1; 705/5
(58) Field of Classification Search .................. None
See application file for complete search history.

(56) References Cited

U.S. PATENT DOCUMENTS

| | | | | |
|---|---|---|---|---|
| 4,774,670 A | | 9/1988 | Palmieri | 364/446 |
| 4,899,157 A | | 2/1990 | Sanford et al. | 342/40 |
| 5,051,910 A | | 9/1991 | Liden | 364/446 |
| 5,265,023 A | | 11/1993 | Sokkappa | 364/439 |
| 5,448,243 A | | 9/1995 | Bethke et al. | 342/59 |
| 5,860,068 A | * | 1/1999 | Cook | 705/26.81 |
| 6,049,754 A | | 4/2000 | Beaton et al. | 701/204 |
| 6,199,008 B1 | | 3/2001 | Aratow et al. | 701/120 |
| 6,308,160 B1 | * | 10/2001 | Rex | 705/6 |
| 6,393,359 B1 | | 5/2002 | Flynn et al. | 701/120 |
| 6,415,207 B1 | * | 7/2002 | Jones | 701/1 |
| 6,496,568 B1 | * | 12/2002 | Nelson | 379/88.12 |
| 6,512,964 B1 | * | 1/2003 | Quackenbush et al. | 700/226 |
| 6,580,998 B2 | | 6/2003 | Flynn et al. | 701/120 |
| 6,754,581 B1 | * | 6/2004 | Blachowicz et al. | 701/528 |
| 6,772,130 B1 | * | 8/2004 | Karbowski et al. | 705/26.1 |
| 7,065,443 B2 | | 6/2006 | Flynn et al. | 701/120 |
| 7,120,537 B2 | | 10/2006 | Flynn et al. | 701/120 |
| 7,120,687 B1 | * | 10/2006 | Tessman et al. | 709/224 |
| 7,207,008 B1 | * | 4/2007 | Koch | 715/736 |
| 7,603,281 B1 | * | 10/2009 | Miller et al. | 705/1.1 |
| 7,689,210 B1 | * | 3/2010 | Bims | 455/422.1 |
| 7,698,327 B2 | * | 4/2010 | Kapur | 707/706 |
| 7,907,067 B2 | * | 3/2011 | Baker et al. | 340/971 |
| 8,145,511 B2 | * | 3/2012 | Dunsky | 705/5 |

(Continued)

FOREIGN PATENT DOCUMENTS

| | | |
|---|---|---|
| GB | 2327517 | 1/1999 |
| JP | 9205378 | 8/1997 |

OTHER PUBLICATIONS

Haerne R. A. et al., Airline Performance Modelling to Support Schedule Development: An Application Case Study, Proceedings of the 1988 Winter Simulation Conference, Dec. 12, 1988, pp. 800-806.

(Continued)

*Primary Examiner* — Ian N Moore
*Assistant Examiner* — Dung B Huynh
(74) *Attorney, Agent, or Firm* — Sunstein Kann Murphy & Timbers LLP

(57) ABSTRACT

A method of providing flight information to a receiving node in data communication with a server. A server receives from a sending node data (1) permitting identification of a flight of interest and (2) permitting identification of the receiving node. The data received at the server causes delivery to the receiving node of a message that includes a logon key that grants access by the receiving node to a data source that provides real-time dynamic information as to position of the flight of interest.

6 Claims, 4 Drawing Sheets

U.S. PATENT DOCUMENTS

| | | | |
|---|---|---|---|
| 2002/0032573 A1* | 3/2002 | Williams et al. | 705/1 |
| 2002/0042864 A1* | 4/2002 | Iizuka | 711/154 |
| 2002/0069093 A1* | 6/2002 | Stanfield | 705/5 |
| 2002/0091782 A1* | 7/2002 | Benninghoff, III | 709/206 |
| 2002/0113826 A1* | 8/2002 | Chuang | 345/835 |
| 2002/0178018 A1* | 11/2002 | Gillis et al. | 705/1 |
| 2003/0009267 A1* | 1/2003 | Dunsky et al. | 701/4 |
| 2003/0093328 A1* | 5/2003 | Koons | 705/26 |
| 2003/0109266 A1 | 6/2003 | Rafiah et al. | 455/456 |
| 2003/0144971 A1* | 7/2003 | Das et al. | 705/401 |
| 2003/0195811 A1* | 10/2003 | Hayes et al. | 705/26 |
| 2003/0204452 A1* | 10/2003 | Wheeler | 705/28 |
| 2003/0233244 A1* | 12/2003 | Kumhyr | 705/1 |
| 2004/0019509 A1* | 1/2004 | Bekkers | 705/5 |
| 2004/0030604 A1* | 2/2004 | Young | 705/26 |
| 2004/0104824 A1* | 6/2004 | Cole et al. | 340/971 |
| 2004/0183695 A1 | 9/2004 | Ruokangas et al. | 340/945 |
| 2004/0203947 A1* | 10/2004 | Moles | 455/466 |
| 2004/0217228 A1 | 11/2004 | Scozzafava | 244/6 |
| 2004/0220845 A1* | 11/2004 | Malapitan | 705/8 |
| 2004/0254808 A1* | 12/2004 | Bennett et al. | 705/1 |
| 2005/0066008 A1* | 3/2005 | Sikora et al. | 709/206 |
| 2005/0071244 A1* | 3/2005 | Phillips et al. | 705/26 |
| 2005/0154685 A1* | 7/2005 | Mundy et al. | 705/404 |
| 2005/0216281 A1* | 9/2005 | Prior | 705/1 |
| 2005/0223343 A1* | 10/2005 | Travis et al. | 715/862 |
| 2005/0234641 A1* | 10/2005 | Marks et al. | 701/213 |
| 2006/0005207 A1* | 1/2006 | Louch et al. | 719/328 |
| 2006/0010394 A1* | 1/2006 | Chaudhri et al. | 715/779 |
| 2006/0020496 A1* | 1/2006 | Azzarello et al. | 705/5 |
| 2006/0025883 A1* | 2/2006 | Reeves | 700/216 |
| 2006/0064410 A1* | 3/2006 | Razza et al. | 707/3 |
| 2006/0080303 A1* | 4/2006 | Sargent et al. | 707/3 |
| 2006/0085238 A1* | 4/2006 | Oden et al. | 705/7 |
| 2006/0173700 A1* | 8/2006 | Fenelon | 705/1 |
| 2006/0184641 A1* | 8/2006 | Moetteli | 709/217 |
| 2006/0192880 A1* | 8/2006 | Takahira et al. | 348/333.05 |
| 2006/0259234 A1 | 11/2006 | Flynn et al. | 701/202 |
| 2006/0282271 A1* | 12/2006 | Ananda et al. | 705/1 |
| 2007/0005232 A1 | 1/2007 | Flynn et al. | 701/120 |
| 2007/0005452 A1* | 1/2007 | Klingenberg et al. | 705/27 |
| 2007/0042772 A1* | 2/2007 | Salkini et al. | 455/431 |
| 2007/0073551 A1* | 3/2007 | Williams et al. | 705/1 |
| 2007/0118525 A1* | 5/2007 | Svendsen | 707/9 |
| 2008/0088433 A1* | 4/2008 | Baker et al. | 340/531 |
| 2008/0097799 A1* | 4/2008 | Scribner | 705/5 |
| 2010/0281411 A1* | 11/2010 | Baker et al. | 715/769 |
| 2012/0023391 A1* | 1/2012 | Djabarov | 715/205 |

OTHER PUBLICATIONS

Wieland, F., Parallel Simulation for Aviation Applications, Proceedings of the 1988 Winter Simulation Conference, Dec. 16, 1998, pp. 1191-1198.

Patent Abstract of Japan, "Traffic Information Terminal Equipment and Traffic Information Processing Method", Korea Mobil Telcommun, Corp., 1997.

Web page from icarus.redlaviation.com pp. 1-3, pre 2004.

Press Release: WSI Launches Flight Watch, Jun. 26, 2001, pp. 1-3.

ArincOpCenter web site page, pp. 1-2, pre 2004.

* cited by examiner

Share Your Flight Experience!
Let your friends and relatives see your flight's progress in real time.

Please tell us your flight information:

Flight #: [_____ 21] Date: [_____ 22]

Please tell us whom you would like to watch your flight's progress.
Enter the information below and the receivers will get a message that includes a link to access your flight's progress in real time.

Friend #1. [_____] ~23
Friend #2. [_____] ~24
Friend #3. [_____] ~25
Friend #4. [_____] ~26

What is your email address? We use this address only to tell the recipient who sent the message.
[_____] ~28

Send an optional message here: ~27
[_____]

[Send!]

*FIG. 2*

FLIGHT INFORMATION SENDING SYSTEM AND METHOD

CROSS REFERENCE TO RELATED APPLICATIONS

The present application claims priority from US Provisional Patent Application Ser. No. 60/865,270, filed Nov. 10, 2006, which is incorporated herein by reference.

TECHNICAL FIELD

The present invention relates to systems and methods for flight information access and delivery.

BACKGROUND ART

It is known in the prior art to provide flight information access via a web server. The inventors herein pioneered a system that is available at the URL www.flightview.com. We describe in this paragraph, and the following two paragraphs, the web server at this URL. The web server at this URL permits a user, for example, to identify a flight (by, among other things, specifying the airline, flight number and date) and, for the flight thus identified, to access from the server an estimated time of arrival of the flight based on live FAA flight data. This web server also permits the user to monitor progress of the flight in real time (assuming that the aircraft has taken off), among other things by watching a graphical display, which is dynamically updated, of the geographical position of the aircraft on a map.

If the aircraft has not taken off, the web server returns a static web page with information that the aircraft has not taken off. The web server also permits the user to cause the server to send a message, via e-mail to a specified e-mail address, containing a link to a static web page permitting access to flight information for a selected flight.

The web server also provides information concerning airport flight delay conditions, in the manner described in U.S. Pat. No. 7,120,537, which is incorporated herein by reference in its entirety.

SUMMARY OF THE INVENTION

A first embodiment of the invention is a method of providing flight information to a receiving node in data communication with a server. The method includes receiving at the server, from a sending node, data (1) permitting identification of a flight of interest and (2) permitting identification of the receiving node. The method also includes—based on the data received at the server—causing delivery to the receiving node of a message including a logon key granting access by the receiving node to a data source providing real-time dynamic information as to position of the flight of interest. Optionally, if the flight of interest has not departed at the time of first access by the receiving node to the data source, then the data source provides dynamic information as to position of the flight of interest at such time as when the flight of interest has departed. Also optionally, if the flight of interest has not departed, the data source also indicates that the flight of interest has not departed. Causing delivery to the receiving node of the message may be conditioned on receipt of financial consideration on behalf of a person utilizing the sending node.

In another embodiment, the invention is a system for providing flight information to a receiving node in data communication with a server. The system of this embodiment includes a communication server, coupled to a data communication network, having an input for receiving data from a sending node coupled to the network. Such data (1) permits identification of a flight of interest and (2) permits identification of the receiving node. The communication server also has an output for causing delivery of a message to a receiving node coupled to the network, such message including a logon key. The system of this embodiment also includes a flight data server, coupled to the network, that, when accessed via the logon key from the receiving node, grants access by the receiving node to real-time dynamic information as to the position of the flight of interest. Optionally, if the flight of interest has not departed at the time of first access by the receiving node to the data source, then the flight data server provides dynamic information as to position of the flight of interest at such time as when the flight of interest has departed. Also optionally, if the flight of interest has not departed, the flight data server also indicates that the flight of interest has not departed. The output of the communication server may be configured to condition delivery of the message to the receiving node on receipt of financial consideration on behalf of a person utilizing the sending node.

BRIEF DESCRIPTION OF THE DRAWINGS

The foregoing features of the invention will be more readily understood by reference to the following detailed description, taken with reference to the accompanying drawings, in which:

FIG. 2 is a representation of a web page, in accordance with an embodiment of the present invention, pursuant to which a user at a sending node may identify a flight of interest and enter a request for delivery to a receiving node of a message including a logon key granting access by the receiving node to a data source providing real-time dynamic information as to position of the flight of interest;

DETAILED DESCRIPTION OF SPECIFIC EMBODIMENTS

Definitions. As used in this description and the accompanying claims, the following terms shall have the meanings indicated, unless the context otherwise requires:

The term "node" shall mean a device, permitting user data communication with a server, connected to a network. A node may be a computer, a personal digital assistant (PDA), a mobile telephone, or similar network appliance. On an IP network, such as the internet, a node has an IP address.

The term "real-time dynamic information" as to position of a flight shall mean information as to flight position that is supplied in a time frame that is approximately contemporaneous and that is updated repetitively so as to maintain the contemporaneous nature of the information.

Figure 1:
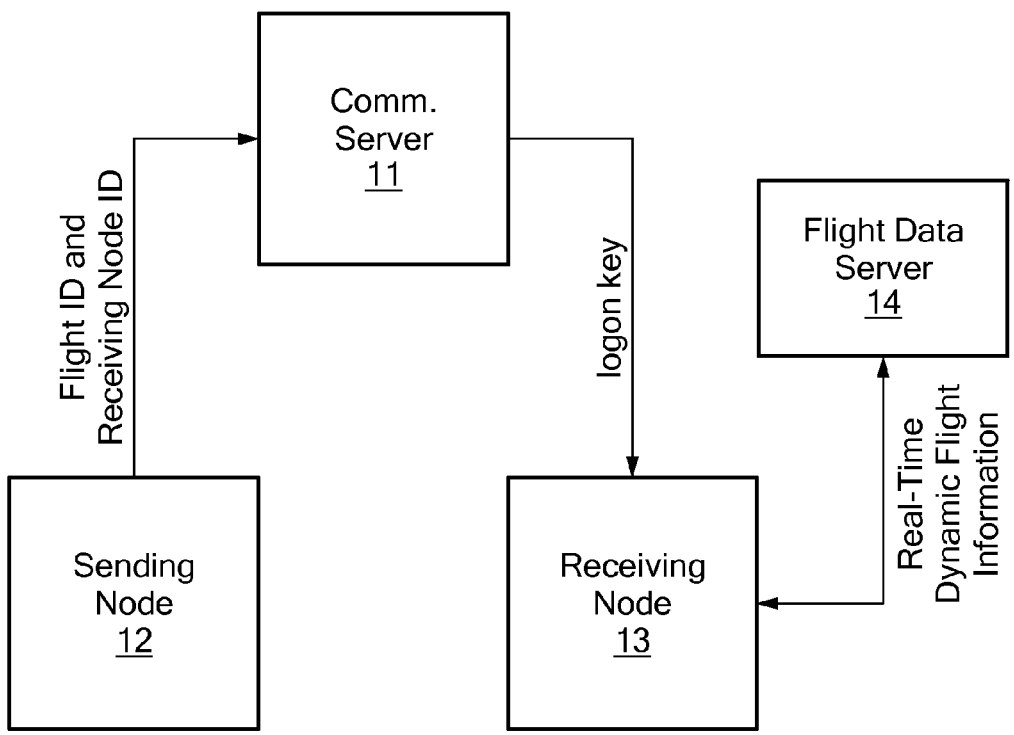
FIG. 1 is a block diagram of an embodiment of a system in accordance with the present invention.

FIG. 1 is a block diagram of an embodiment of a system in accordance with the present invention. The sending node 12 is coupled to a network, such as the internet, and is thereby in data communication with the communication server 11. Via a web page for data entry, such as discussed below in connection with FIG. 2, a user of the sending node 12 supplies data to the communication server 11 that is sufficient to identify a flight of interest, as well as an address, such as an e-mail address for sending a message that can be received by receiving node 13, which is also in data communication with the communication server 11.

The communication server causes the message to be sent to receiving node 13. The message includes a logon key by which a person at receiving node 13 may access flight data server 14. Accessing the flight data server 14 via the logon key permits access by the receiving node of real-time dynamic flight information for the flight of interest specified to the communication server 11 from the sending node 12. The real-time flight dynamic flight information is provided by means known in the art, which may include, for example, use of a Java applet on the receiving node to cause repetitive polling of the flight data server and downloading of updated graphic information. If the flight has not yet departed, then the flight data server is configured to cause the receiving node 13 to indicate the fact that the flight has not departed, but the polling continues so that the departure can be seen when it occurs.

FIG. 2 is a representation of a web page, in accordance with an embodiment of the present invention, pursuant to which a user at a sending node may identify a flight of interest and enter a request for delivery to a receiving node of a message including a logon key granting access by the receiving node to a data source providing real-time dynamic information as to position of the flight of interest. The web page is a form by which the user may provide data to identify the flight number in box 21 (including the airline designator) and data to identify the corresponding date in box 22, as well as e-mail addresses in boxes 23-26 for parties to receive messages with the logon key. An opportunity is presented to provide an optional message in box 27, and the user is also prompted for the user's e-mail address in box 28.

Figure 3:
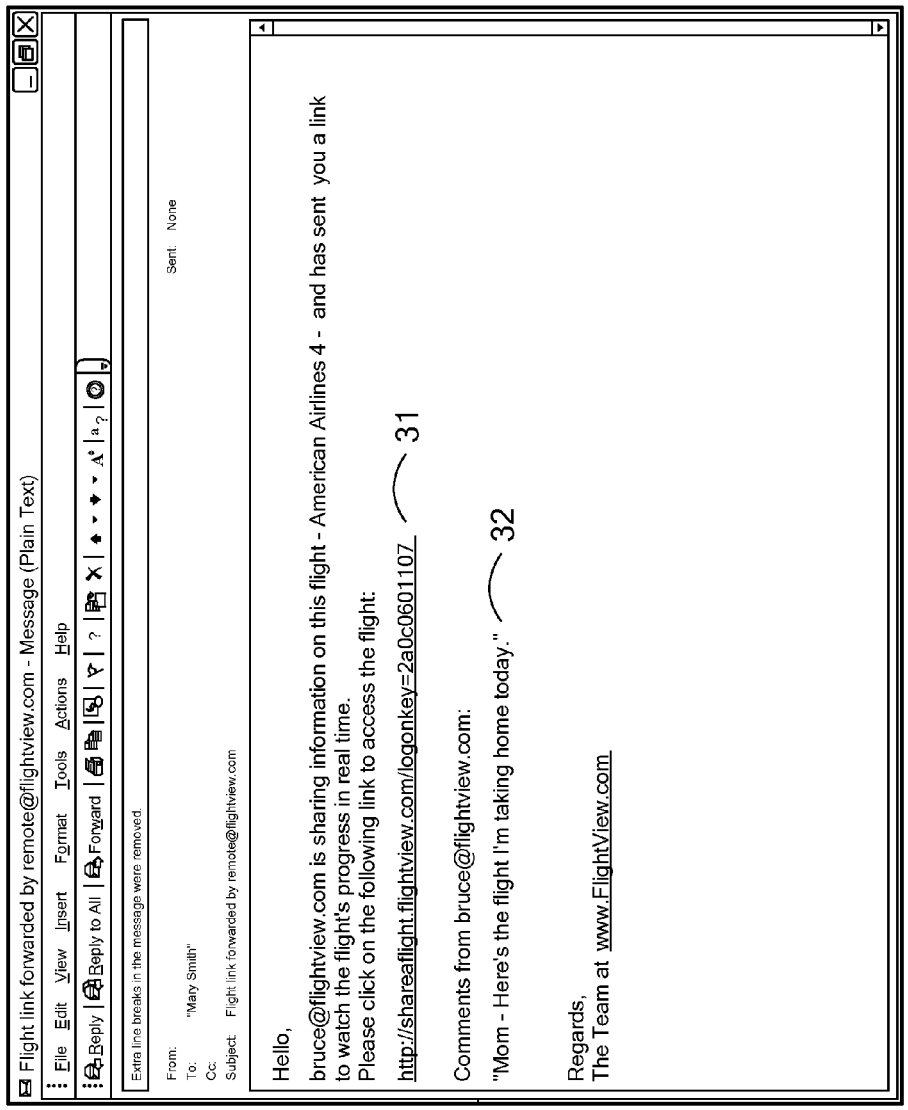
FIG. 3 is a representation of the message for which delivery has been requested via the web page of FIG. 2.

FIG. 3 is a representation of the message for which delivery has been requested via the web page of FIG. 2. The message includes a logon key 31, shown here as a link, as well as a message 32 provided by the user who requested the delivery of the message.

Figure 4:
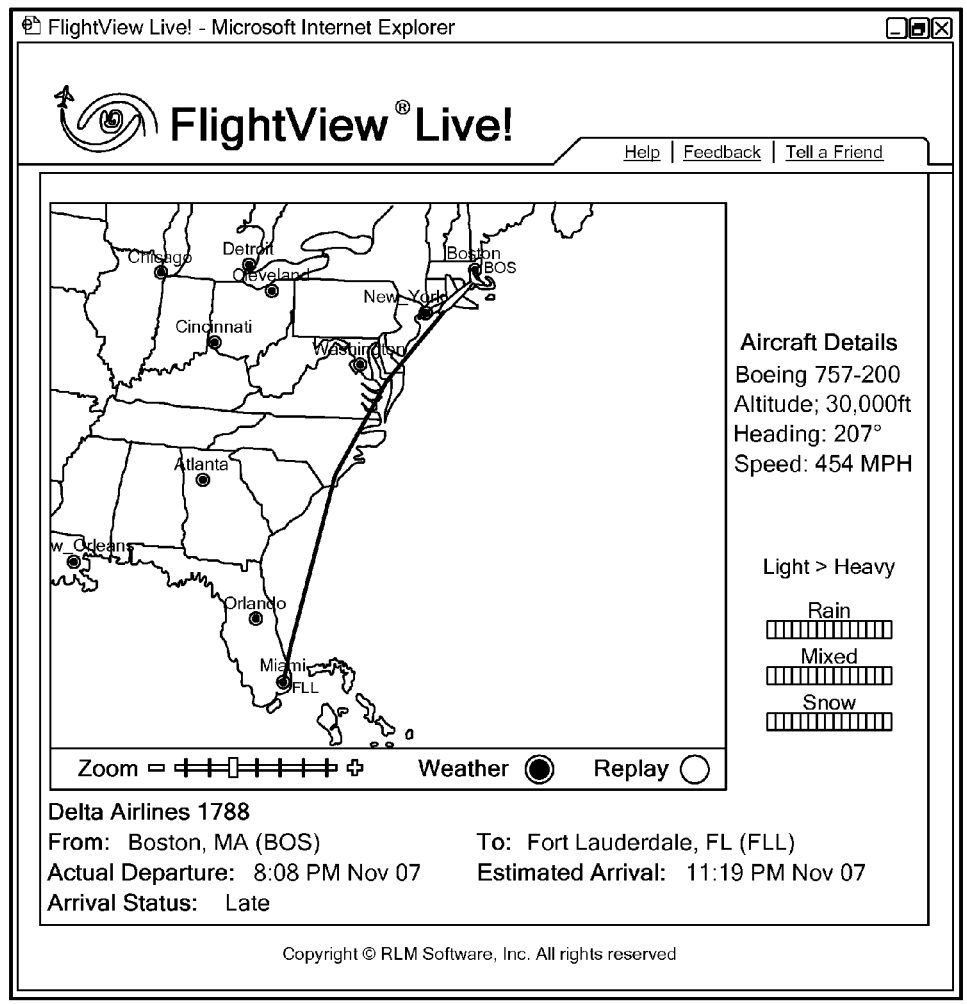
FIG. 4 is a representation of the real-time dynamic information as to position of the flight of interest made available at the receiving node on utilizing the logon key.

FIG. 4 is a representation of the real-time dynamic information as to position of the flight of interest made available at the receiving node upon utilization of the logon key.

What is claimed is:

1. A method of providing flight information for a flight of interest to a receiving node in data communication with a flight information system, the method comprising:
   generating and periodically updating in the flight information system, real-time dynamic flight information for a plurality of flights;
   receiving at the flight information system, from a sending node, flight identification identifying the flight of interest and third party user node identification data identifying the receiving node;
   based on the flight identification and third party user node identification data received at the flight information system, causing delivery to the receiving node of an e-mail message including a logon key which when utilized by the receiving node causes delivery to the receiving node of flight information for the flight of interest updated as of when the logon key is utilized; and
   wherein, if the flight of interest has not departed at the time of first utilization by the receiving node of the logon key, then in response thereto the delivered flight information indicates the flight of interest has not departed.

2. A method according to claim 1, wherein causing delivery to the receiving node of the message is conditioned on receipt of financial consideration on behalf of a person utilizing the sending node.

3. A method according to claim 1, wherein upon delivery of updated flight information for the flight of interest a repetitive polling application causes repeated downloading of updated real-time dynamic flight information to the receiving node.

4. A system for providing flight information for a flight of interest to a receiving node comprising:
   a communication server, coupled to a data communication network, having an input for receiving flight identification and third party user node identification data from a sending node coupled to the network, such data (1) permitting identification of the flight of interest and (2) permitting identification of the receiving node, such server also having an output for causing delivery of an e-mail message to a receiving node coupled to the network, such e-mail message including a logon key; and
   a flight data server generating and periodically updating real-time dynamic flight information for a plurality of flights, the flight data server coupled to the network such that when accessed via utilization of the logon key by the receiving node, the flight data server delivers to the receiving node flight information for the flight of interest updated as of when the logon key is utilized and wherein, if the flight of interest has not departed at the time of first utilization of the logon key by the receiving node, then in response thereto the flight data server delivers flight information that indicates the flight of interest has not departed.

5. A system according to claim 4, wherein the output of the communication server conditions delivery of the message to the receiving node on receipt of financial consideration on behalf of a person utilizing the sending node.

6. A system according to claim 4, wherein the flight data server delivers to the receiving node real-time dynamic flight information for the flight of interest.

\* \* \* \* \*